May 17, 1938.  W. AMES  2,117,268
GAUGE
Filed April 29, 1936
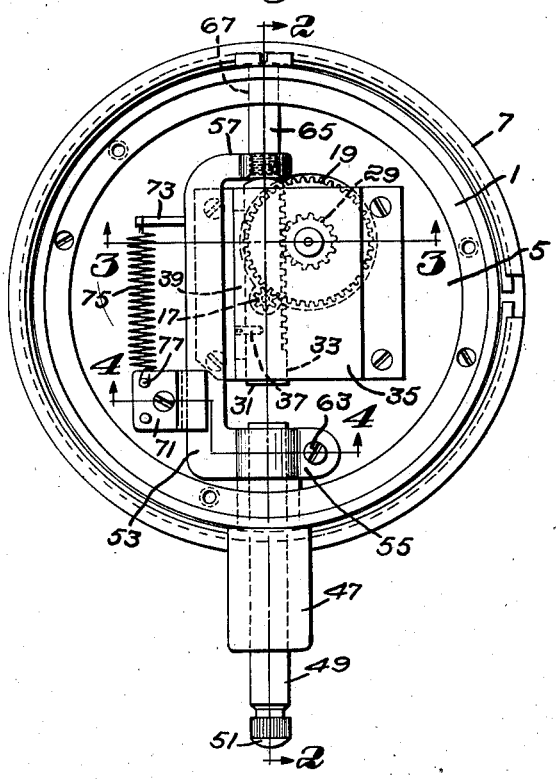
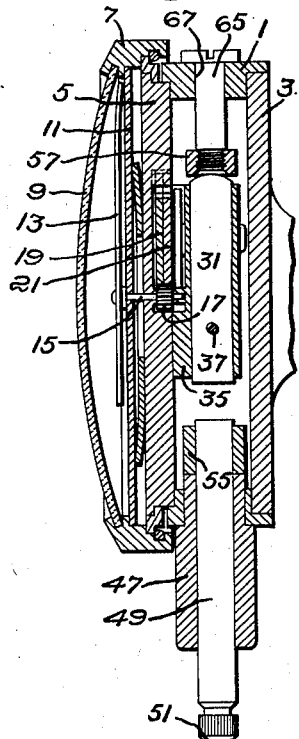
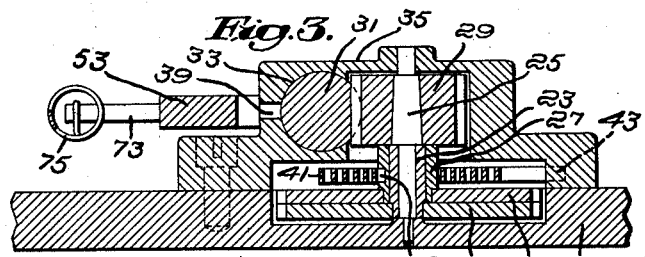
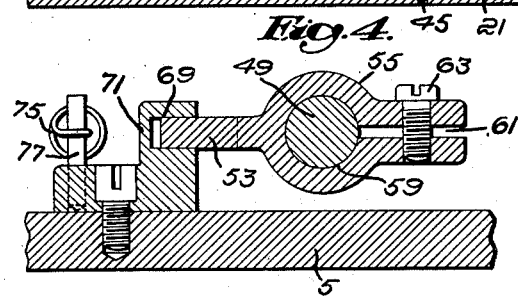
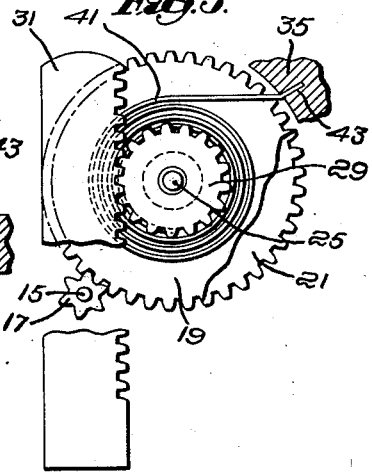
Inventor:
Warren Ames,
by Emery Booth Townsend Miller & Weidner
Att'ys Patented May 17, 1938

2,117,268

UNITED STATES PATENT OFFICE 2,117,268

GAUGE

Warren Ames, Newton, Mass.

Application April 29, 1936, Serial No. 76,986

10 Claims. (Cl. 33—172)

My invention, which relates to gauges, and has among its objects the provision of a shock absorber for the gauge mechanism, will be best understood from the following description when read in the light of the accompanying drawing of an embodiment of the invention, the scope of which invention will be more particularly pointed out in the appended claims.

In the drawing:—

Fig. 1 is a rear elevation of a dial micrometer gauge, constructed according to the invention, with the back plate removed;

Figs. 2, 3 and 4 are sections on the lines 2—2, 3—3, and 4—4 respectively of Fig. 1; and Fig. 5 is a more or less diagrammatic view illustrating a detail.

The gauge shown in the drawing is a dial micrometer gauge of the type shown by United States patents to Robbins 1,619,370, issued March 1, 1927, and Ames 1,903,322, issued April 4, 1933, the particular invention embodied in gauge constituting an improvement in the inventions of applicant's co-pending applications Serial No. 699,148, filed November 22, 1933, and Serial No. 5,051, filed February 5, 1935.

Referring to the drawing, I have shown a gauge which comprises a support including the ring-like casing member 1, back plate 3, and front plate 5. Mounted on the front plate is a bezel ring 7 which carries a crystal 9 and dial 11. Cooperating with the dial is a movable indicator member in the form of a hand or pointer 13. Conveniently, the construction is such that the bezel is rotatable relative to the front plate so that the dial carried by the bezel may be adjusted to place the zero point of the dial graduations (not shown) or other selected point under the hand. The construction of the bezel and associated parts may be as shown by the Ames Patent 1,903,322 above referred to, and need not be further described.

As illustrated, the movable hand 13 is carried by a rotatable spindle 15 to which is fixed a center pinion 17. Meshing with the center pinion is a pair of coaxially arranged gears 19 and 21. The gear 21 has fixedly secured thereto a hub portion 23 which in turn is fixedly secured to a spindle 25, while the gear 19 is fixedly secured to a hub portion 27 which is rotatably mounted on the hub portion 23. Fixedly secured to the end portion of the spindle opposite the gear 21 is a pinion 29 which meshes with a toothed reciprocatory member, the latter as shown being in the form of a cylindrical rack 31 mounted for rectilinear reciprocation in the bore 33 of the block 35 secured to and carried by the front plate 5. As shown, rotation of the rack 31 in the bore 33 is prevented by a pin 37 carried by and projecting radially from the rack and slidably fitting a longitudinally extending slot 39 formed in the block 35.

Cooperating with the gear wheel 19 is a light torsion spring 41 under initial tension, the outer end 43 of which spring is connected to the block 35 while its inner end 45 is connected to the hub 27 of this gear wheel. It will be observed by this construction that when the rack 31 is moved downward, as viewed in Fig. 1, the hand 13 will be rotated, rotation of the center pinion 17 also causing rotation of the gear 19 in such direction as to wind up the torsion spring, and that said torsion spring through the gear 19 and center pinion normally tends to urge the rack upward, as viewed in Fig. 1. The torsion spring and gear 19 herein not only serve to urge the rack 31 to move in one direction but also serve to take up back-lash in the train gearing for transmitting motion from the rack to the hand.

As shown, the ring-like casing member 1 carries a perforated sleeve 47 in which is reciprocally mounted a rod 49, the lower end of which rod is provided with a contact feeler 51 adapted to contact with the work. Inside the gauge casing is a yoke 53 having at one end an arm 55 and at its opposite end an arm 57. As shown, the arm 55 is provided with a perforation 59 which receives the inner end of the rod 49, the arm being split as indicated at 61 and being provided with a clamping screw 63 for securely clamping the arm to the end of the rod 49. The other arm 57, as shown, carries a rod 65 which projects through and is guided in a perforation 67 in the ring-like casing member 1. As shown, for preventing rotation of the yoke 53 it is made of rectangular cross-section and slidably fits a guide slot 69 in a block 71 secured to and carried by the front plate 5. Carried by the yoke is a projecting pin 73 to which is attached one end of a helical spring 75 under initial tension, the other end of this spring being attached to a pin 77 carried by the block 71.

It will be observed that the under side of the arm 57 of the yoke, as viewed in Fig. 1, serves as a stop for the rack 31, the upper end of which rack is urged into contact with said arm by the torsion spring 41. The spring 75 however is stout enough and under sufficient initial tension to exert on the yoke 53 a force sufficient to hold the yoke normally in the position shown by Fig. 1 against the force exerted thereon by the spring 41.

From the above described construction it will be observed that when the contact feeler 51 engages the work to push the rod 49 and yoke 53 upward, as viewed in Fig. 1, the rack 31 will be urged by the torsion spring 41 to follow the arm 57 of the yoke. As a consequence of this action if the contact feeler is struck with a violent blow to drive it inward the force of said blow will not be imparted to the rack or the gearing meshing with it. In gauges as heretofore constructed such a blow is imparted directly to the rack and gearing, and frequently results in severe injury to the gauge, commonly breaking or stripping the teeth of the gearing, which it will be understood are rather delicate as the gauge illustrated in the accompanying drawing is drawn to a much larger scale than represents a gauge constructed according to common practice.

It will be understood that within the scope of the appended claims wide deviations may be made from the gauge illustrated and described without departing from the spirit of the invention.

I claim:

1. A gauge having, in combination, a movable indicator member, mechanism for operating the latter comprising a reciprocatory member and motion transmitting means operatively connecting it to said indicator member, means operatively acting upon said reciprocatory member for urging it in one direction of movement, a second reciprocatory member operatively movable relative to the first mentioned reciprocatory member and adapted to be moved by the thing to be gauged in the same direction as the first mentioned reciprocatory member is urged by said means, said second reciprocatory member having a portion thereof in the path of movement of said first mentioned reciprocatory member whereby it acts as a positioning stop for the latter, and means constituting a support for the elements enumerated.

2. A gauge having, in combination, a movable indicator member, mechanism for operating the latter comprising a reciprocatory member and motion transmitting means operatively connecting it to said indicator member, means operatively acting upon said reciprocatory member for urging it in one direction of movement, a second reciprocatory member operatively movable relative to the first mentioned reciprocatory member and adapted to be moved by contact with the work in the same direction as the first mentioned reciprocatory member is urged by said means, said second reciprocatory member having a portion thereof in the path of movement of said first mentioned reciprocatory member whereby it acts as a positioning stop for the latter, means urging said second reciprocatory member to move in a direction opposite to that in which said first mentioned reciprocatory member is urged to move by said first mentioned means and under a greater force, and means constituting a support for the elements enumerated.

3. A gauge having, in combination, a movable indicator member, a reciprocatory rack, gearing connecting said member to said rack, means operatively acting upon said rack for urging it to move in one direction, a reciprocatory member operatively movable relative to said rack and adapted to be moved by contact with the work in the same direction as said rack is urged to move by said means, said reciprocatory member having a portion thereof in the path of movement of said rack whereby it acts as a positioning stop for the latter, means operatively acting upon said reciprocatory member to move it in the opposite direction to that in which said rack is urged to move and under a greater force, and means constituting a support for the elements enumerated.

4. A gauge having, in combination, a movable indicator member, a reciprocatory rack, gearing connecting said member to said rack, back-lash take-up means acting upon said gearing adjacent its connection to said indicator member and acting yieldingly to urge said rack to move in one direction, a reciprocatory member operatively movable relative to said rack and adapted to be moved by contact with the work in the same direction as said rack is urged to move by said means, said reciprocatory member having a portion thereof in the path of movement of said rack whereby it acts as a positioning stop for the latter, means operatively acting upon said reciprocatory member to move it in the opposite direction to that in which said rack is urged to move and under a greater force, and means constituting a support for the elements enumerated.

5. A gauge having, in combination, a movable indicator member, a reciprocatory rack, gearing connecting said member to said rack, means comprising an idle gear acting upon said gearing adjacent its connection to said indicator member and acting yieldingly to urge said rack to move in one direction, a reciprocatory member operatively movable relative to said rack and adapted to be moved by contact with the work in the same direction as said rack is urged to move by said means, said reciprocatory member having a portion thereof in the path of movement of said rack whereby it acts as a positioning stop for the latter, means operatively acting upon said reciprocatory member to move it in the opposite direction to that in which said rack is urged to move and under a greater force, and means constituting a support for the elements enumerated.

6. A gauge having, in combination, a movable indicator member, a center pinion connected thereto, a reciprocatory rack, gearing connecting said rack to said center pinion, means comprising a gear meshing with said center pinion and a spring acting upon said gear for urging said rack to move in one direction, a reciprocatory member operatively movable relative to said rack and adapted to be moved by contact with the work in the same direction as said rack is urged to move by said means, said reciprocatory member having a portion thereof in the path of movement of said rack whereby it acts as a positioning stop for the latter, means operatively acting upon said reciprocatory member to move it in the opposite direction to that in which said rack is urged to move and under a greater force, and means constituting a support for the elements enumerated.

7. A gauge having, in combination, a movable indicator member, a center pinion connected thereto, a reciprocatory rack, gearing operatively connecting said rack to said indicator member, which gearing includes a gear meshing with said center pinion, a second gear positioned coaxially of said first mentioned gear also meshing with said center pinion, a spring acting upon said second gear for urging said rack to move in one direction, a reciprocatory member operatively adapted to be moved by contact with the work in the same direction as said rack is urged to move by said means, said reciprocatory member having a portion thereof in the path of movement of said rack whereby it acts as a positioning stop for the latter, means operatively acting upon said reciprocatory member to move it in the opposite direction to that in which said rack is urged to move and under a greater force, and means constituting a support for the elements enumerated.

8. A gauge having, in combination, a movable work contact, a movable indicator member, means for causing said work contact to position said indicator member comprising a pair of parts constituting cooperating stops, motion transmitting means connecting one of said parts to said indicator member, which means includes a center pinion connected to said indicator member and a gear meshing with said pinion, a second gear coaxial with the first mentioned gear also meshing with said center pinion, a spring acting upon said second mentioned gear for urging said part connected to said indicator member to move in one direction, means operatively connecting the other of said parts to said work contact for movement thereby in the same direction as that in which the first mentioned part is urged to move by said spring, means urging said part which is connected to said work contact to move in the opposite direction to that in which the other part is urged to move by said spring and under a greater force, and means constituting a support for the elements enumerated.

9. A gauge having, in combination, a movable work contact, a movable indicator member, means for causing said work contact to position said indicator member comprising a pair of parts constituting cooperating relatively movable reciprocatory stops one of which is moved in one direction by said work contact, motion transmitting means connecting the other of said parts to said indicator member, means operatively acting to urge the last mentioned part into contact with said part moved by said work contact, and means operatively acting to urge said part moved by said work contact in the opposite direction under a greater force.

10. A gauge having, in combination, a movable work contact, a movable indicator member, means for causing said work contact to position said indicator member comprising a pair of parts constituting cooperating relatively movable reciprocatory stops one of which is moved in one direction by said work contact, motion transmitting means connecting the other of said parts to said indicator member, means acting upon said motion transmitting means operatively acting to urge the last mentioned part into contact with said part moved by said work contact, and means operatively acting to urge said part moved by said work contact in the opposite direction under a greater force.

WARREN AMES.